Figure 1:
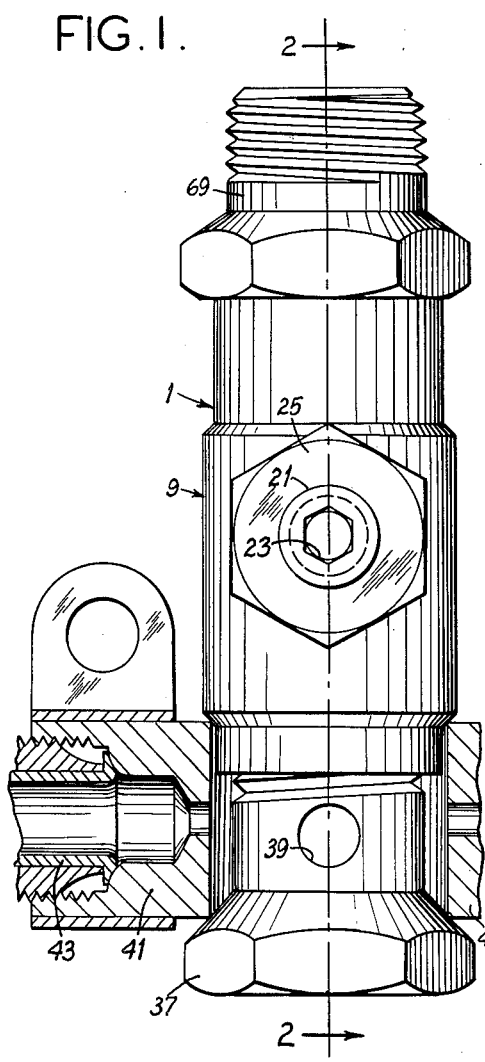

Dec. 19, 1961　　　L. C. ROTTER　　　3,013,633
LUBRICANT INJECTOR
Filed Feb. 16, 1959

Lutwin C. Rotter,
Inventor.
Koenig and Pope,
Attorneys.

United States Patent Office 3,013,633
Patented Dec. 19, 1961

3,013,633
LUBRICANT INJECTOR
Lutwin C. Rotter, Ladue, Mo., assignor to The McNeil Machine & Engineering Company, Akron, Ohio, a corporation of Ohio
Filed Feb. 16, 1959, Ser. No. 793,437
11 Claims. (Cl. 184—7)

This invention relates to lubricant injectors, and more particularly to lubricant injectors for use in pressure lubricating systems and a method of metering out small amounts of lubricant.

The invention is particularly concerned with an injector of the type shown in the Fox et al. United States Patent 2,637,413, dated May 5, 1953, among its several objects being the provision of an injector of this type which is modified so as to be capable of metering out minute quantities of oil, much smaller than can be metered out by the prior injector, and which is particularly useful for the lubrication of textile machinery, especially for lubricating the spinning rings of spinning frames; the provision of an injector capable of such operation and being adapted for adjustment to vary the output per cycle; the provision of a method for metering out minute drops of liquid; and the provision of such an injector which is of simple construction, reliable in operation, and economical to manufacture.

The injector shown in United States Patent 2,637,413 essentially comprises a body providing a discharge chamber, having an inlet at one end and an outlet at the other end and a measuring chamber extending laterally from the discharge chamber with an opening or transfer port therebetween. A check valve is provided in the outlet. A plunger is movable in the discharge chamber and is biased by a plunger return spring to a retracted position wherein the transfer port is unblocked to establish communication between the measuring chamber and the discharge chamber. The plunger is movable by pressure in the inlet through a pressure stroke toward the outlet across the transfer port to force an amount of lubricant through the outlet check valve and then to establish communication from the inlet through the transfer port to the measuring chamber. In the measuring chamber is a piston backed by a piston return spring. In the operation of this type of injector, when the pressure in the inlet is increased, the plunger is driven through a pressure stroke and forces a charge of lubricant from the discharge chamber through the outlet check valve. When the plunger reaches the end of its pressure stroke, lubricant flows from the inlet through the transfer port into the measuring chamber and forces the piston in the measuring chamber back against the force of the piston return spring. Thus, the measuring chamber receives a charge of lubricant, the amount of the charge being dependent upon the displacement of the piston. Upon relief of pressure in the inlet, the plunger is driven back by the plunger return spring to its retracted position, whereupon the measuring piston forces lubricant from the measuring chamber into the discharge chamber, thereby recharging the injector and resetting it for the next cycle.

The injector shown in United States Patent 2,637,413 thus depends for recharging the discharge chamber on the spring-biased measuring piston forcing the charge from the measuring chamber into the discharge chamber, the volume of the charge being equal to the displacement of the piston. I have found that it is possible rapidly to meter out tiny droplets of oil (which may be as minute as a few millionths of an ounce up to one-thousandth of an ounce, for example) by utilizing the compressibility of the oil for recharging the discharge chamber instead of using the spring-loaded measuring piston of the injector shown in United States Patent 2,637,413. While liquids are generally thought of as being incompressible, it will be understood that any liquid (including oil) is compressible to some extent. This compressibility is utilized for accomplishing the charging of the discharge chamber from the measuring chamber with a minute quantity of oil by providing a substantially inexpansible measuring chamber of substantially constant volume (instead of an expansible measuring chamber as in United States Patent 2,637,413). When the plunger is driven through a pressure stroke, oil is supplied under pressure to the measuring chamber. When the plunger is retracted, the discharge chamber is evacuated and when the plunger moves past the transfer port, the residual pressure in the oil which has been compressed in the measuring chamber is released with the result that a minute quantity of oil (corresponding to the amount the oil expands on release of pressure) is forced over into the discharge chamber, and it is this minute amount of oil that is forced out through the outlet check valve when the plunger is driven through a pressure stroke.

Other objects and features of the invention will be in part apparent and in part pointed out hereinafter.

The invention accordingly comprises the constructions and methods hereinafter described, the scope of the invention being indicated in the following claims.

Figure 2:
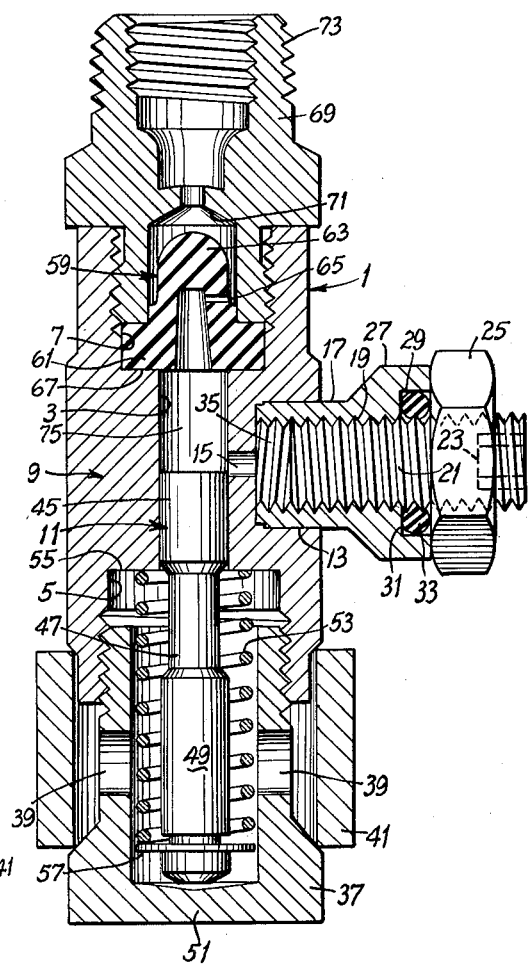

In the accompanying drawings, in which one of various possible embodiments of the invention is illustrated, FIG. 1 is a view in elevation of an injector of this invention mounted on an adaptor, the latter being broken away and shown in section; and, FIG. 2 is a vertical section taken on line 2—2 of FIG. 1.

Corresponding reference characters indicate corresponding parts throughout the several views of the drawings.

Referring to the drawings, an injector of this invention is shown to comprise an injector body 1 of cylindrical form having an axial bore 3 with a counterbore 5 at one end (its lower end as shown in the drawings) and a counterbore 7 at its other (upper) end. Bore 3 is in an enlarged intermediate portion 9 of body 1 constituting a cylinder for a plunger 11. Counterbore 5 provides an inlet for the cylinder 9. Counterbore 7 provides an outlet for the cylinder 9. The body 1 is provided with a lateral cylindrical recess or socket 13 generally at the center of its length and with a hole 15 of smaller diameter than socket 13 extending from the inner end of the socket to the bore 3 in cylinder 9.

A cylinder 17 is secured in fluid-tight relation in the socket 13 as by press-fitting and brazing and extends laterally outward from cylinder 9. Cylinder 17 is internally threaded as indicated at 19. A screw 21 is threaded in the cylinder 17 from its outer end. This screw has a hexagonal socket 23 in its outer end for receiving a wrench (not shown) for turning the screw to adjust it in or out. A lock nut 25 is threaded on the outer end of the screw. Cylinder 17 has an enlarged outer end portion 27 which is counterbored as indicated at 29 to provide an internal outwardly facing annular shoulder 31. Screw 21 extends through a packing ring 33 accommodated in counterbore 29, this ring being compressed by the lock nut against shoulder 31 for sealing purposes.

The inner end of the screw 21 is spaced from the inner end of the socket 13. Thus, a chamber 35 is defined by the inner end of the socket 13, the inner end portion of cylinder 17, and the inner end of the screw 21. This chamber constitutes a substantially inexpansible constant volume measuring chamber, from which the hole 15, which constitutes a transfer port, opens laterally into the cylinder 9. The volume of chamber 35 may be varied by turning screw 21 in or out, but, once adjusted, screw 21 is locked in position by lock nut 25 so that the chamber 35 is a constant-volume chamber.

A fitting 37 is threaded in the lower counterbore 5 and extends down from the injector body 1. Below the body 1, the fitting 37 has lateral inlet ports 39 for admission of lubricant under pressure thereto. Surrounding the fitting 37, in sealed relation thereto, is an adaptor 41 to which may be connected a lubricant supply line 43 for furnishing lubricant under pressure for admission through inlet ports 39 to the fitting 37. The plunger 11 has an upper cylindrical portion 45 having a sliding sealing fit in the bore 3 of cylinder 9. Below this upper portion 45, the plunger has a relatively wide annular groove 47. The lower portion of the plunger below the groove 47 is designated 49. The fitting 37 is closed at its lower end as indicated at 51. The plunger extends down into the fitting 37. A coil compression spring 53 surrounding the plunger reacts from the shoulder 55 at the inner (upper) end of the lower counterbore 5 against a collar 57 on the lower portion 49 of the plunger to bias the plunger downward to a retracted position determined by the engagement of the lower end of the plunger with the closed lower end 51 of the fitting 37.

In the upper counterbore or outlet 7 is an outlet check valve 59. As shown in FIG. 2, this comprises a one-piece molded body of rubber or the like, preferably a lubricant-resistant synthetic rubber such as Hycar (a butadiene copolymer with acrylonitrile), having a flat base 61 with a nipple 63 projecting upward from the base. The nipple has a transverse slit 65 adapted to open up for flow of lubricant out of the nipple under pressure in the nipple and to close upon relief of pressure in the nipple to prevent back flow. The base 61 fits in the counterbore 7 against the shoulder 67 at the lower end of the counterbore 7, and is held in the counterbore 7 by a gland 69 threaded in the counterbore 7. This gland compresses the base 61 against shoulder 67 to provide a seal. It has an axial passage 71 receiving the nipple, this passage constituting an outlet passage. The gland is formed as indicated at 73 for connection of a lubricant discharge line.

When the plunger 11 is in its retracted position of FIG. 2, its upper end is below the top of transfer port 15 so that the latter is unblocked for communication from the measuring chamber 35 to the space 75 in cylinder 9 forward of (above) the plunger. This space constitutes a discharge chamber. The injector inlet 5 is then blocked off from port 15 by the upper portion 45 of the plunger. Upon increase of pressure in the inlet 5 to a predetermined value, the plunger 11 is driven forward (upward) from its retracted position through a pressure stroke against the return bias of the plunger spring 53. Upward movement of the plunger is limited by engagement of its upper end with the bottom of valve 59 for determining the end of its pressure stroke. Valve 59, being made of rubber, acts as a cushion for the impact at the end of the pressure stroke. Assuming that there is a charge of lubricant in the discharge chamber 75 as a result of a previous cycle, this charge is dispensed for injection upon the pressure stroke of the plunger.

The length of the upper portion 45 of the plunger 11 above the plunger groove 47 and the width of the groove are such that when the plunger is in its forward (upward) position at the end of its pressure stroke, the groove 47 provides for communication from inlet 5 through bore 3 to the transfer port 15. Accordingly, lubricant under pressure is supplied to the measuring chamber 35 from inlet 5 through transfer port 15, lubricant filling the measuring chamber 35 in amount corresponding to the volume of the measuring chamber, and being compressed therein. Upon relief of pressure in the inlet 5, spring 53 returns the plunger to its retracted (lowered) position of FIG. 2. The width of the groove 47 is such that immediately after the beginning of the return movement of the plunger, the upper portion 45 of the plunger blocks off the transfer port 15 to trap lubricant under pressure (and under compression) in the measuring chamber 35. The lubricant remains compressed in the measuring chamber until the plunger substantially completes its return to retracted position. As the plunger returns to retracted position, the discharge chamber 75 increases in volume and is evacuated, and when the plunger substantially completes its return to retracted position, the upper end of the plunger passes below the top of port 15. Port 15 is thereupon unblocked to the discharge chamber 75, and the compression in the volume of lubricant in the measuring chamber 35 is then effective to cause an expansion of this volume with delivery of lubricant in the amount of the expansion into the evacuated discharge chamber. This amount (which is minute) constitutes the measured charge, which is delivered on the next pressure stroke of the plunger.

The amount of the charge may be adjusted by turning the screw 21 in or out to change the volume of the measuring chamber 35. With the screw all the way in (measuring chamber 35 of minimum volume), the charge is a minimum (a few millionths of an ounce, for example). With the screw backed off for maximum volume of measuring chamber 35, the charge is a maximum (one thousandth of an ounce, for example). The injector may be mounted in any position, but when mounted horizontally, the screw 21 should point upward.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. A lubricant injector comprising a cylinder having an inlet and an outlet, an inexpansible constant volume measuring chamber with a transfer port opening laterally into the cylinder, a check valve in the outlet, a plunger movable forward in the cylinder through a pressure stroke toward the outlet and across said port for forcing lubricant out through the check valve, and movable rearward away from the outlet and back across said port to a retracted position wherein said port is unblocked for communication from said measuring chamber through said port to the space in the cylinder forward of the plunger, said space constituting a discharge chamber, means biasing said plunger to its retracted position, said plunger being movable forward from its retracted position through a pressure stroke against the bias by lubricant under pressure in the inlet, said plunger being formed to provide for communication from the inlet through said port to the measuring chamber when the plunger is in a forward position, thereby to supply lubricant under pressure from the inlet to the measuring chamber, said lubricant filling said measuring chamber and said measuring chamber thereby containing a substantially constant volume of lubricant therein equal to the volume of said measuring chamber, said volume being under compression when the plunger is at the end of its pressure stroke and being trapped in said measuring chamber under compression until the plunger is returned to retracted position under its bias upon relief of pressure in the inlet, the discharge chamber thereupon being evacuated, and the compression in said volume of lubricant being effective, when the plunger in returning to retracted position unblocks said port to said discharge chamber, to cause an expansion of said volume with delivery of lubricant in the amount of said expansion into the evacuated discharge chamber.

2. A lubricant injector as set forth in claim 1 wherein the forward end of the plunger is spaced rearward of the forward side of the transfer port when the plunger is in retracted position and wherein the plunger has an annular groove which, when the plunger is at the end of its pressure stroke, provides for communication from the inlet to the transfer port, the portion of the plunger forward of the groove blocking off the transfer port immediately upon return movement of the plunger.

3. A lubricant injector as set forth in claim 2 wherein the inlet is at one end of the cylinder and the outlet is at the other end of said cylinder, and wherein the outlet check valve is constituted by a rubber nipple, the forward end of the plunger being engageable with the base of the rubber nipple at the end of a pressure stroke of the plunger.

4. A lubricant injector comprising a first cylinder having an inlet and an outlet, a second cylinder extending laterally from the first cylinder with a transfer port providing for communication between said cylinders, a screw threaded in the second cylinder providing an inexpansible constant volume measuring chamber at the inner end of said screw with said transfer port opening laterally into the first cylinder from said measuring chamber, a check valve in the outlet, a plunger movable forward in the first cylinder through a pressure stroke toward the outlet and across said port for forcing lubricant out through the check valve, and movable rearward away from the outlet and back across said port to a retracted position wherein said port is unblocked for communication from said measuring chamber through said port to the space in the first cylinder forward of the plunger, said space constituting a discharge chamber, means biasing said plunger to its retracted position, said plunger being movable forward from its retracted position through a pressure stroke against the bias by lubricant under pressure in the inlet, said plunger being formed to provide for communication from the inlet through said port to the measuring chamber when the plunger is in a forward position, thereby to supply lubricant under pressure from the inlet to the measuring chamber, said lubricant filling said measuring chamber and said measuring chamber thereby containing a substantially constant volume of lubricant therein equal to the volume of said measuring chamber, said volume being under compression when the plunger is at the end of its pressure stroke and being trapped in said measuring chamber under compression until the plunger is returned to retracted position under its bias upon relief of pressure in the inlet, the discharge chamber thereupon being evacuated, and the compression in said valve of lubricant being effective, when the plunger in returning to retracted position unblocks said port to said discharge chamber, to cause an expansion of said volume with delivery of lubricant in the amount of said expansion into the evacuated discharge chamber.

5. A lubricant injector as set forth in claim 4 wherein the forward end of the plunger is spaced rearward of the forward side of the transfer port when the plunger is in retracted position and wherein the plunger has an annular groove which, when the plunger is at the end of its pressure stroke, provides for communication from the inlet to the transfer port, the portion of the plunger forward of tthe groove blocking off the transfer port immediately upon return movement of the plunger.

6. A lubricant injector as set forth in claim 5 wherein the inlet is at one end of the cylinder and the outlet is at the other end of said cylinder, and wherein the outlet check valve is constituted by a rubber nipple, the forward end of the plunger being engageable with the base of the rubber nipple at the end of a pressure stroke of the plunger.

7. A lubricant injector as set forth in claim 4 wherein the second cylinder has an annular recess at its outer end, a packing ring in the recess, and a lock nut threaded on the screw and compressing said ring.

8. A lubricant injector as set forth in claim 4 wherein the second cylinder has its inner end secured in a lateral socket in the first cylinder.

9. The method of metering out small amounts of a liquid comprising trapping the liquid under pressure in an inexpansible chamber and then opening the chamber to allow the liquid to expand and thereby to deliver from said chamber liquid in the amount of the expansion.

10. The method of metering out small amounts of a liquid comprising the steps of filling an inexpansible chamber with the liquid under pressure, holding the liquid under pressure within said chamber so that the liquid is in a compressed condition, and then opening said chamber to allow the liquid to expand and thereby deliver from said chamber liquid in the amount of the expansion.

11. The method of metering out small amounts of a liquid comprising the steps of filling an inexpansible chamber with the liquid under pressure through a port until the chamber is completely filled with liquid under pressure, closing the port to hold liquid under pressure in the chamber, and then opening said port to allow said liquid under pressure to expand and thereby to deliver from said chamber liquid in the amount of the expansion.

References Cited in the file of this patent

UNITED STATES PATENTS

| | | |
|---|---|---|
| 1,942,096 | Hallerberg | Jan. 2, 1934 |
| 2,122,177 | Klein | June 28, 1938 |
| 2,197,247 | Bijur | Apr. 16, 1940 |
| 2,637,413 | Fox et al. | May 5, 1953 |
| 2,674,343 | Malerme | Apr. 6, 1954 |
| 2,742,978 | Peterson et al. | Apr. 24, 1956 |